O. THIBAULT.
SCREENING SHOVEL.
APPLICATION FILED SEPT. 11, 1913.
1,087,849.
Patented Feb. 17, 1914.
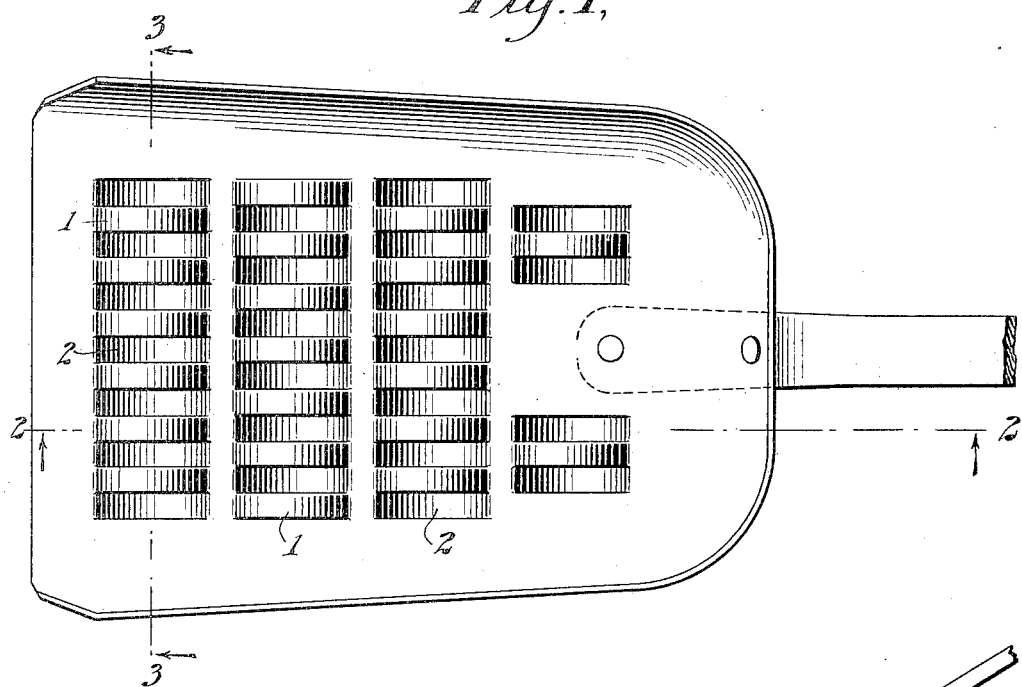
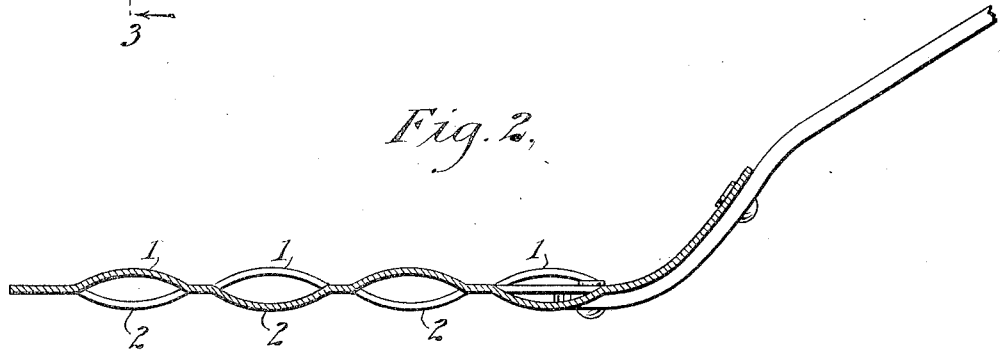
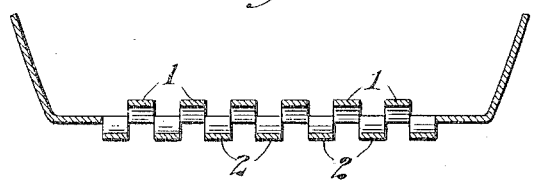
WITNESSES
Edw. Thorpe
A. H. Davis
INVENTOR
Onésime Thibault
BY Munn & Co.
ATTORNEYS

UNITED STATES PATENT OFFICE.

ONÉSIME THIBAULT, OF FALL RIVER, MASSACHUSETTS.

SCREENING-SHOVEL.

1,087,849.  Specification of Letters Patent.  Patented Feb. 17, 1914.

Application filed September 11, 1913. Serial No. 789,307.

*To all whom it may concern:*

Be it known that I, ONÉSIME THIBAULT, a citizen of the United States, and a resident of Fall River, in the county of Bristol and State of Massachusetts, have invented an Improvement in Screening-Shovels, of which the following is a specification.

My invention is an improvement in the class of shovels adapted for screening or sifting cinders, coal, and other like commodities.

The invention is hereinafter described in detail, and illustrated in the accompanying drawing, in which—

Figure 1 is a plan view of the shovel-blade including a portion of the handle. Fig. 2 is a longitudinal section on the line 2—2 of Fig. 1. Fig. 3 is a transverse section on the line 3—3 of Fig. 1.

The shovel-blade is formed of thin metal, preferably of wrought iron or steel struck up in dies into the required form. It is provided with a series of transverse rows of bars or strips 1 and 2, those indicated by the first numeral being raised or bowed upward, and the intervening or alternate ones, indicated by 2, being bowed or depressed downward. The strips or bars are formed by slitting the blade and bending the portions between the slits alternately in opposite directions. The rows of bars are arranged a short distance apart, and the several strips or bars are arranged parallel to each other and parallel to the longer axis of the shovel-blade. The strips or bars are narrow and of uniform width throughout their length, and it will be seen that, by the alternate and contiguous arrangement of the upwardly and downwardly bent or bowed bars, openings are formed on both the upper and lower sides of the blade, which permit ashes or coal dust or other fine comminuted material to pass readily through the blade while larger pieces are retained on the shovel. It is apparent that the form or slight convexity of the bars, which is in a direction to the length of the blade, enables the latter to be easily inserted in or under cinders, coal, or other material requiring to be sifted or screened. When a shovelful of the material is raised, the side of the blade is struck against the side of a receptacle for the finer material, which causes the latter to pass easily and quickly through the openings formed by and between the bowed bars 1 and 2.

The shovel-blade may be cheaply and easily produced by means of cutting and shaping dies.

What I claim is:—

1. A screening shovel having its blade provided with a series of slits and having the material between the slits bent alternately in opposite directions to form a series of contiguous bars projecting alternately from opposite sides of the blade.

2. A screening shovel having its blade provided with a plurality of longitudinally extending slits arranged in transverse and spaced rows, the material between the slits of the several rows being bent alternately in opposite directions to form a series of longitudinally extending contiguous bars projecting alternately from opposite sides of the blade and arranged in transverse rows.

ONÉSIME THIBAULT.

Witnesses:
 WILLIAM C. GRAY,
 WELLAM S. JACKSON.

Copies of this patent may be obtained for five cents each, by addressing the "Commissioner of Patents, Washington, D. C."